United States Patent
Ivarsson et al.

(10) Patent No.: US 12,316,367 B2
(45) Date of Patent: May 27, 2025

(54) DIGITAL FRONT END SUPER PATHS

(71) Applicant: Dell Products L.P., Round Rock, TX (US)

(72) Inventors: Tommy Ivarsson, Ottawa (CA); Sewvanda Don, Ottawa (CA); John Bradley Deforge, Chelsea (CA)

(73) Assignee: DELL PRODUCTS L.P., Round Rock, TX (US)

( * ) Notice: Subject to any disclaimer, the term of this patent is extended or adjusted under 35 U.S.C. 154(b) by 475 days.

(21) Appl. No.: 17/660,341

(22) Filed: Apr. 22, 2022

(65) Prior Publication Data

US 2023/0344459 A1   Oct. 26, 2023

(51) Int. Cl.
*H04W 52/20* (2009.01)
*H04B 1/40* (2015.01)

(52) U.S. Cl.
CPC ...................... *H04B 1/40* (2013.01)

(58) Field of Classification Search
CPC ........................................................ H04B 1/40
See application file for complete search history.

(56) References Cited

U.S. PATENT DOCUMENTS

| | | | | |
|---|---|---|---|---|
| 9,130,634 B2* | 9/2015 | Yan | ...................... | H04B 7/0602 |
| 10,153,801 B2* | 12/2018 | Gabai | ................... | G10L 21/0208 |
| 2012/0269123 A1* | 10/2012 | Porat | ....................... | H04L 1/007 |
| | | | | 370/328 |
| 2013/0063608 A1* | 3/2013 | Tierney | ................... | H04L 43/08 |
| | | | | 348/E5.096 |
| 2013/0142184 A1* | 6/2013 | Wang | ..................... | H04L 1/0065 |
| | | | | 370/338 |
| 2013/0235961 A1* | 9/2013 | Yoon | ...................... | H04B 1/123 |
| | | | | 375/350 |
| 2014/0068694 A1* | 3/2014 | Ling | ........................ | H04H 40/27 |
| | | | | 725/127 |
| 2015/0063431 A1* | 3/2015 | Yan | ....................... | H04B 7/0802 |
| | | | | 375/222 |
| 2015/0349836 A1* | 12/2015 | Ponukumati | ......... | H04W 88/06 |
| | | | | 455/553.1 |
| 2018/0053997 A1* | 2/2018 | Noto | ..................... | H04B 1/0475 |
| 2019/0173500 A1* | 6/2019 | Artemenko | ............ | H01Q 1/247 |
| 2020/0021041 A1* | 1/2020 | Artemenko | ........... | H01P 1/2138 |

OTHER PUBLICATIONS

Invitation to Pay Additional Fees for PCT Application No. PCT/US2022/053282 mailed Apr. 24, 2023, 12 pages.

(Continued)

*Primary Examiner* — Hai V Nguyen
(74) *Attorney, Agent, or Firm* — Amin, Turocy & Watson, LLP

(57) ABSTRACT

A system can comprise a radio unit. The system can further comprise a group of antenna branches of the radio unit. The system can further comprise a group of digital front ends of the radio unit, wherein respective digital front ends of the group of digital front ends are configured to process data of respective antenna branches of the group of antenna branches. The system can further comprise a digital front end super path that is configured to select between the group of antenna branches, wherein the digital front end super path comprises a tap point at which data processed via the digital front end super path is able to be accessed.

20 Claims, 14 Drawing Sheets

(56) References Cited

OTHER PUBLICATIONS

International Search Report and Written Opinion for PCT Application No. PCT/US2022/053282 mailed Jun. 20, 2023, 18 pages.
International Search Report and Written Opinion for PCT Application No. PCT/US2022/053282 mailed Jun. 27, 2023, 18 pages.
Notification Concerning Transmittal of Copy of International Preliminary Report on Patentability for PCT Application No. PCT/US2022/053282 mailed Oct. 31, 2024, 11 pages.
European Office Action mailed Nov. 29, 2024 for European Patent Application No. 22851427.9, 3 pages.

* cited by examiner

600

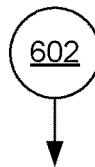

SELECTING A FIRST ANTENNA BRANCH FROM A GROUP OF ANTENNA BRANCHES OF A RADIO UNIT, WHEREIN RESPECTIVE DIGITAL FRONT ENDS OF A GROUP OF DIGITAL FRONT ENDS ARE CONFIGURED TO PROCESS DATA OF RESPECTIVE ANTENNA BRANCHES OF THE GROUP OF ANTENNA BRANCHES 604

IN RESPONSE TO SELECTING THE FIRST ANTENNA BRANCH, ROUTING DATA FOR THE FIRST ANTENNA BRANCH THROUGH A DIGITAL FRONT END SUPER PATH, WHEREIN THE DIGITAL FRONT END SUPER PATH IS CONFIGURED TO SELECTIVELY ROUTE DATA FOR ANTENNA BRANCHES OF THE GROUP OF ANTENNA BRANCHES 606

FIG. 6

DIGITAL FRONT END SUPER PATHS

BACKGROUND

A radio can comprise a receiver and a transmitter that are used to receive and transmit, respectively, data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise a radio unit. The system can further comprise a group of antenna branches of the radio unit. The system can further comprise a group of digital front ends of the radio unit, wherein respective digital front ends of the group of digital front ends are configured to process data of respective antenna branches of the group of antenna branches. The system can further comprise a digital front end super path that is configured to select between the group of antenna branches, wherein the digital front end super path comprises a tap point at which data processed via the digital front end super path is able to be accessed.

An example method can comprise selecting, by a system comprising a processor, a first antenna branch from a group of antenna branches of a radio unit, wherein respective digital front ends of a group of digital front ends are configured to process data of respective antenna branches of the group of antenna branches. The method can further comprise, in response to selecting the first antenna branch, routing, by the system, data for the first antenna branch through a digital front end super path, wherein the digital front end super path is configured to selectively route data for antenna branches of the group of antenna branches.

An example apparatus can comprise a group of digital front ends of a radio unit, wherein respective digital front ends of the group of digital front ends are configured to process data of respective antenna branches of a group of antenna branches. The apparatus can further comprise a first digital front end that is configured to select between the group of antennas for processing of data via the first digital front end, wherein the first digital front end is separate from the group of digital front ends.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates an example process flow that can facilitate digital front end super paths, in accordance with an embodiment of this disclosure;

DETAILED DESCRIPTION

Overview

Figure 1A:
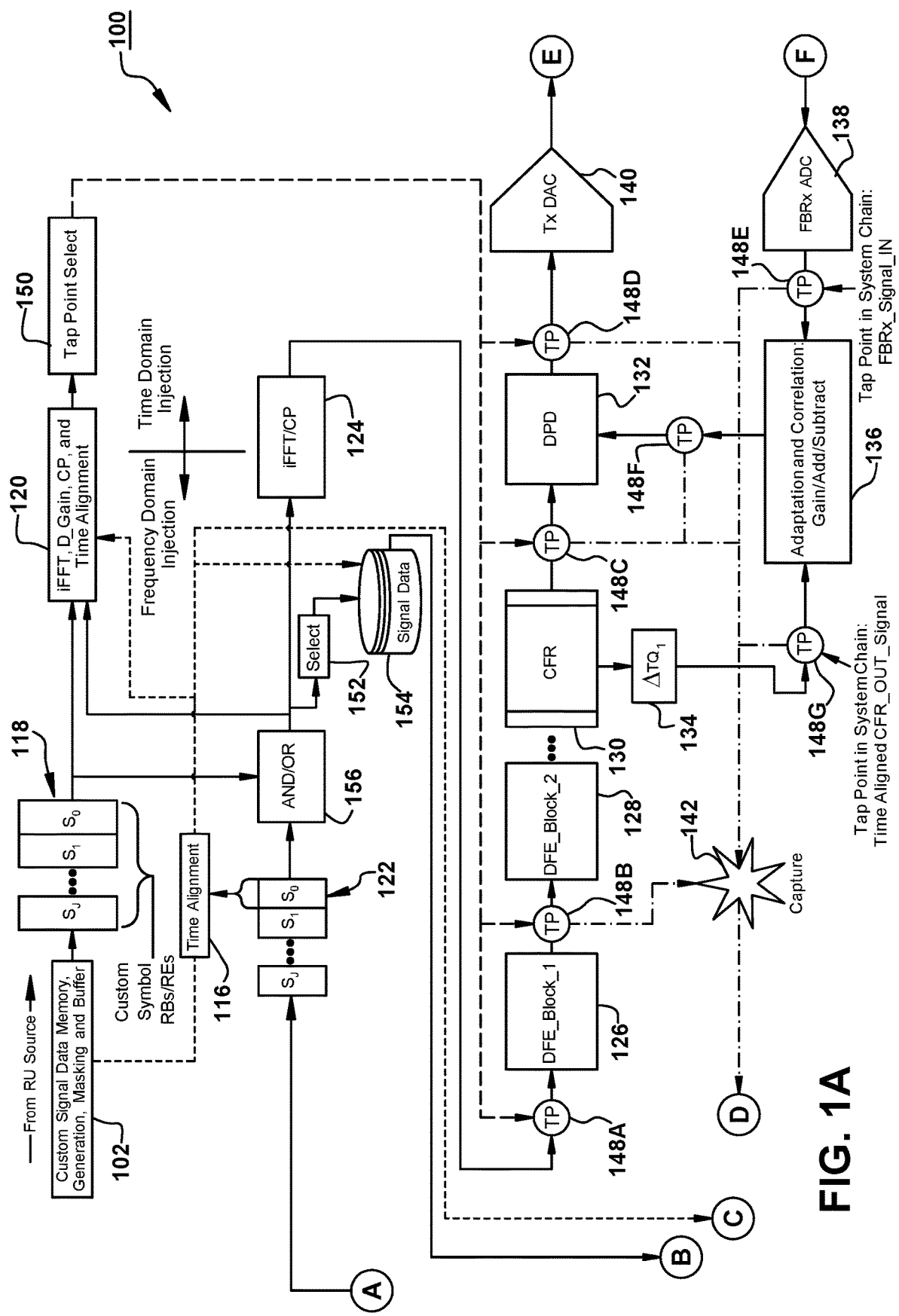
FIG. 1A, FIG. 1B, and FIG. 1C illustrate an example system architecture for a down link chain of a radio system that can facilitate digital front end super paths, in accordance with an embodiment of this disclosure.

In modern wireless communications deployments, aspects and impacts of radio development engineering and system design tradeoffs can have far-reaching implications into customer capital expenditures, operating expenditures and overall completeness of a vendor's radio offerings. These engineering and systems design tradeoffs can result in what can be generally characterized as overall radio size, weight, thermal dissipation, reliability, complexity, and cost.

In a radio system, instrumentation of signal paths (e.g., disposing tap points within signal paths for injecting a signal or reading a signal) can be implemented to evaluating initial performance and operational performance of a radio system.

An ability to capture, analyze, and store frequency domain data and time domain data can facilitate performing system measurements and performance assessments. In production and in the field, tap points embedded within a digital front end (DFE) path of a radio system can provide access to complex sub-systems in digital domain circuitry.

A problem with embedding tap points in a radio system can be a large number of positions in which a tap point can be useful. There can be many paths within each antenna carrier instantiation of a radio system, and embedding tap points in all valuable positions can be a challenge. Similarly, reducing the number of subsystems accessible via a tap point can limit a fullness and extent of instrumentability.

A solution to these problems associated with instrumenting digital front end paths can involve implementing a digital front end super path, which, in some examples, can access a signal from any antenna branch of the radio system, and contain tap points so that that signal can be accessed at different positions within a digital front end signal chain.

The present techniques can be implemented to facilitate implementing custom tap points and instrumentation designed into a minimal number of digital front end paths, while also providing an ability to capture signal data.

In some prior approaches, custom tap points are not a part of a normal digital front end data path.

In some examples, the present techniques can be implemented to instrument some, but not all, digital front end path(s) of a radio system. In some examples, an instrumented digital front end path can have an antenna main path multiplexed to it, thereby becoming the main signal path for that antenna branch. This approach multiplexing and providing an instrumented digital front end path can be implemented for a down link signal path and/or an up link signal path.

Instrumented digital front end paths can have an ability to multiplex digital front end signals back off to their antenna path after being processed through a digital front end super path. That is, a signal can be multiplexed from a particular antenna path and into a digital front end super path, and then multiplexed back into that antenna path after passing through the digital front end super path (where multiplexing the signal back into the antenna path can route around that antenna path's normal digital front end).

In some examples, a digital front end super path (which can be referred to as an instrumented digital front end path) can maintain all of its signal processing configurations that can be found on non-instrumented main digital front end paths.

The present techniques can be implemented to facilitate full instrumentation of one, some, or all digital front end data paths of a radio system. In some examples, full instrumentation can be impractical. To overcome this problem, a digital front end super path can be implemented to create system injection and capture points while minimizing a complexity involved with doing so.

In some examples where there are N digital front ends, a digital front end super path can be added for N+1 total paths (or multiple—M—digital front end super paths can be added for N+M total paths). A digital front end super path can instantiate a full instrumented path that contains injection and capture tap points.

Tapped digital front end signaling can be routable from a digital from end super path to analysis and storage for the signal. In some examples, any antenna path can be multiplexed to or from a digital front end super path.

In some examples, a digital front end super path can be configurable to all (or any) digital configuration, which can copy possible digital configurations on any main live-air traffic paths (sometimes referred to as main mission mode paths). In some examples, a digital front end super path can carry a copy of any live-air path antenna path signal data, or temporarily replace data in a live-air path, and carry live-air path signal data while simultaneously furnishing instrumentation.

A digital front end super path can be used to branch data onto a non-official highway for further detailed analysis, capture, and/or storage.

In some examples, a digital front end super path can have a dedicated supervision path.

In some examples, multiplexing can comprise antenna path switching at a radio system-acceptable rate that is sufficient to facilitate accessing signals on different digital front end paths quickly.

In some examples according to the present techniques, there can be a need for custom signal injection. Custom signal injection can be facilitated by hardware accelerated signal data preconditioning for speed of processing and actuation. Digital front end super paths can reduce an overall dependence on digital signal processing fabric resources to transport and forward data within an overall set of digital front ends, as certain digital signal processing functions can be limited to a few fully-loaded super paths. The present techniques can be implemented to reduce complexity of digital front end blocks for main chains, where in some examples, only multiplexers are added. Digital front end super paths can provide for a greater complexity and more repeatability in performance.

Analog circuitry can have latency as a signal passes from block to block. For ease of comparison and hardware acceleration in a determination of radio performance, time alignment can be implemented to facilitate a precise alignment of a source signal and a signal that is captured. In some examples, the signal is not captured at an input, but can be a memory representation of the input signal.

EXAMPLE ARCHITECTURES

Figure 1B:
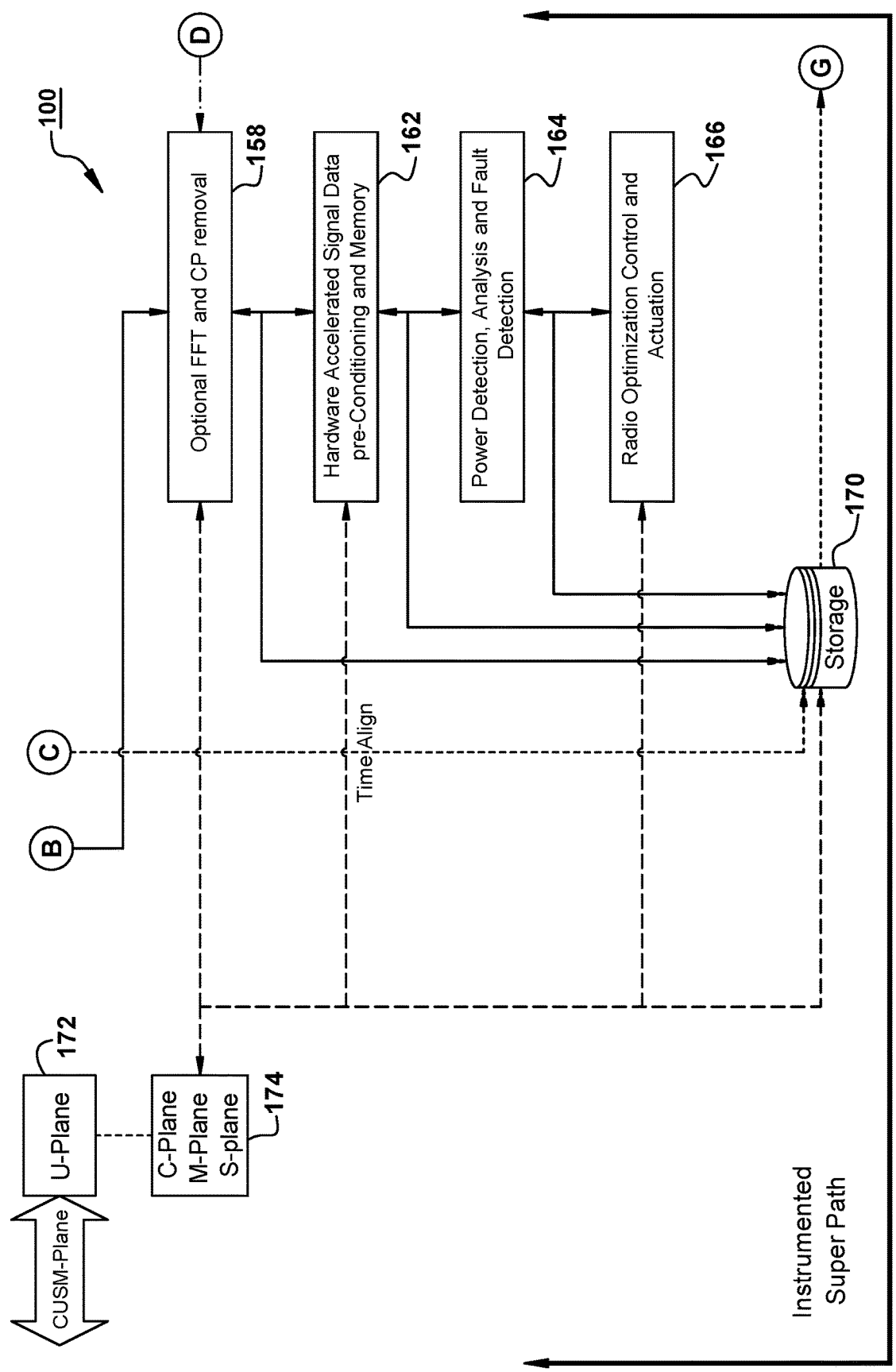
Figure 1C:
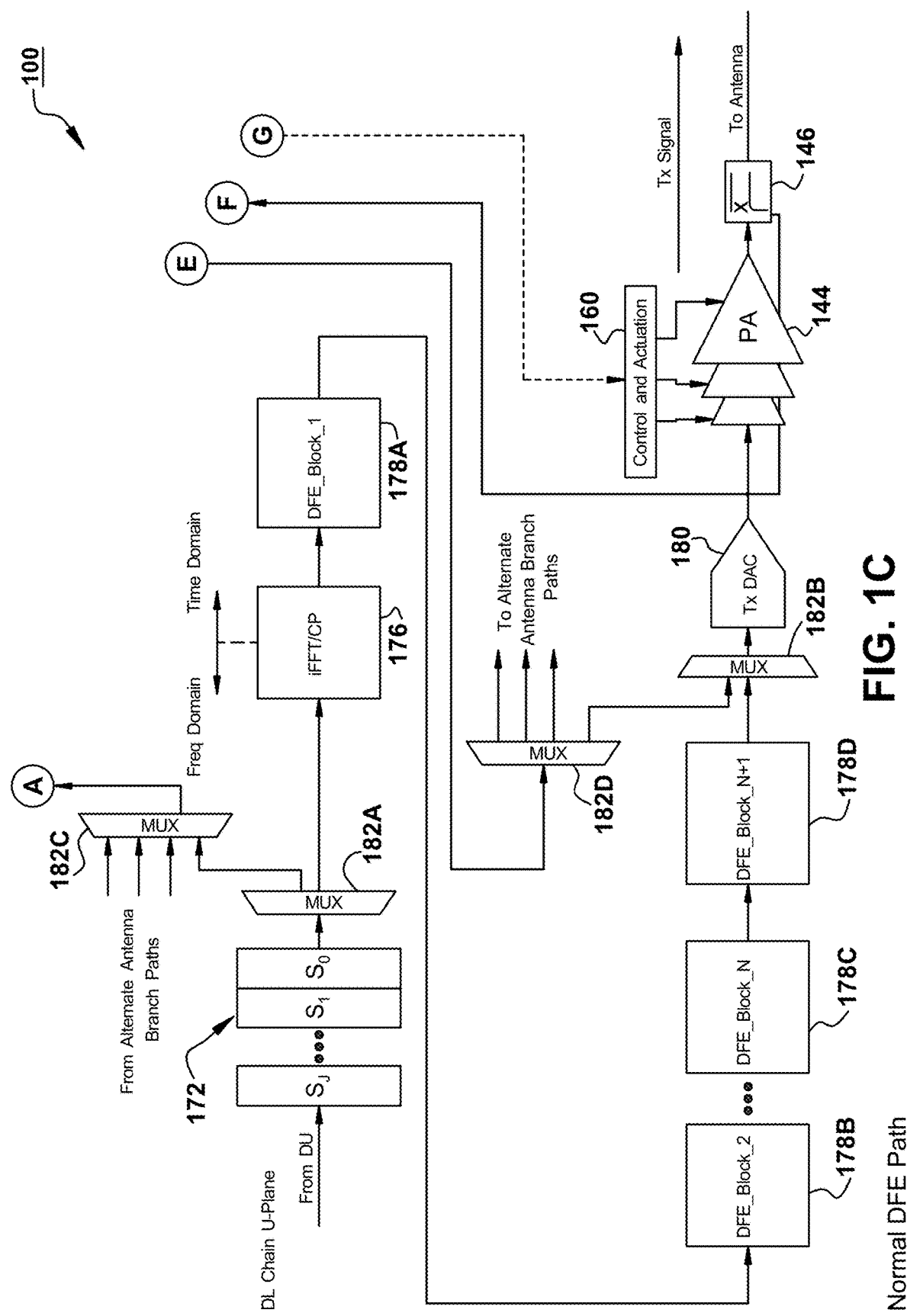

FIG. 1A, FIG. 1B, and FIG. 1C illustrate an example system architecture 100 for a down link chain of a radio system that can facilitate digital front end super paths, in accordance with an embodiment of this disclosure.

System architecture 100 can function as a down link signal path of a radio system, where signals from the down link signal path can be routed, or multiplexed, to a digital front end super path. As depicted, system architecture 100 comprises custom signal data memory, generation, masking, and buffer 102 (which can comprise a combination of some or all of a look up table, a pseudo-random look up table generator, a generator, a memory, an OR gate to combine data sources, masking, and a buffer), time alignment 116, custom symbol resource bands/resource elements (RBs/REs) 118, inverse Fast Fourier Transform (iFFT) 120 (which can also perform A gain, time alignment, and optional cyclic prefix (CP) insertion), RBs/REs 122, iFFT/CP 124, digital front end (DFE) block 1 126, DFE block 2 128, crest factor reduction (CFR) 130, digital pre-distortion (DPD) 132, delta-time-phase ($\Delta T\Theta$) 134, adaptation and correlation 136, feedback receiver analog-to-digital converter (FBRx ADC) 138, transmitter digital-to-analog converter (Tx ADC) 140, capture 142, power amplifier 144, signal coupler 146, tap point 148A, tap point 148B, tap point 148C, tap point 148D, tap point 148E, tap point 148F (which can be accessed to capture a FBRx_Signal_IN), tap point 148G (which can be accessed to capture a CFR_OUT_Signal), tap point select 150, select 152, signal data 154, AND/OR 156, hardware accelerated signal data pre-conditioning and memory 158, optional FFT and CP removal 162, analysis and fault detection 164, radio optimization control and actuation 166, storage 170, custom symbol RBs/REs 172, C-plane, M-plane, S-plane 174, iFFT/CP 176, DFE block 1 178A, DFE block 2 178B, DFE block N 178C, DFE block N+1 178D, transmitter digital-to-analog converter (Tx DAC) 180, multiplexer 182A, multiplexer 182B, multiplexer 182C, and multiplexer 182D.

Multiplexer 182C can comprise a multiplexer from alternate antenna branch paths to a super path that generally can comprise RBs/REs 122. Multiplexer 182D can comprise a multiplexer from the super path and back to alternate antenna branch paths.

Multiplexer 182A can multiplex a signal on an antenna branch path further down that antenna branch path (e.g., to iFFT/CP 176) and to multiplexer 182C for possible multiplexing into a super path (e.g., to RBs/REs 122). Multiplexer 182B can multiplex a signal from a super path back into that antenna branch path (e.g., to Tx DAC 180). In some examples, multiplexer 182D can multiplex a signal from the super path back into any antenna branch that is accessible via multiplexer 182D.

Figure 2A:
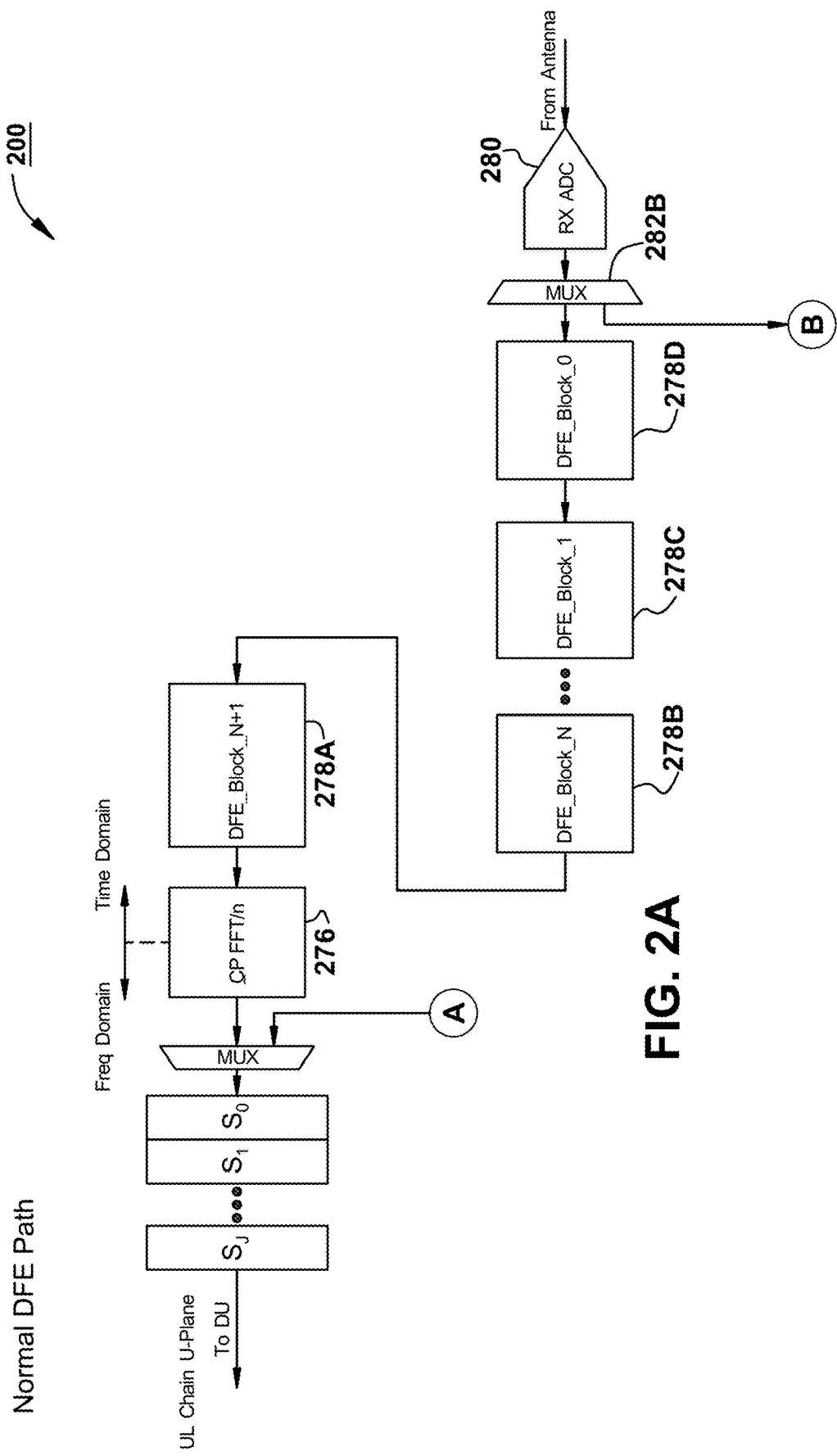
FIG. 2A, FIG. 2B, and FIG. 2C illustrate an example system architecture for an up link chain of radio unit that can facilitate digital front end super paths, in accordance with an embodiment of this disclosure.
Figure 2B:
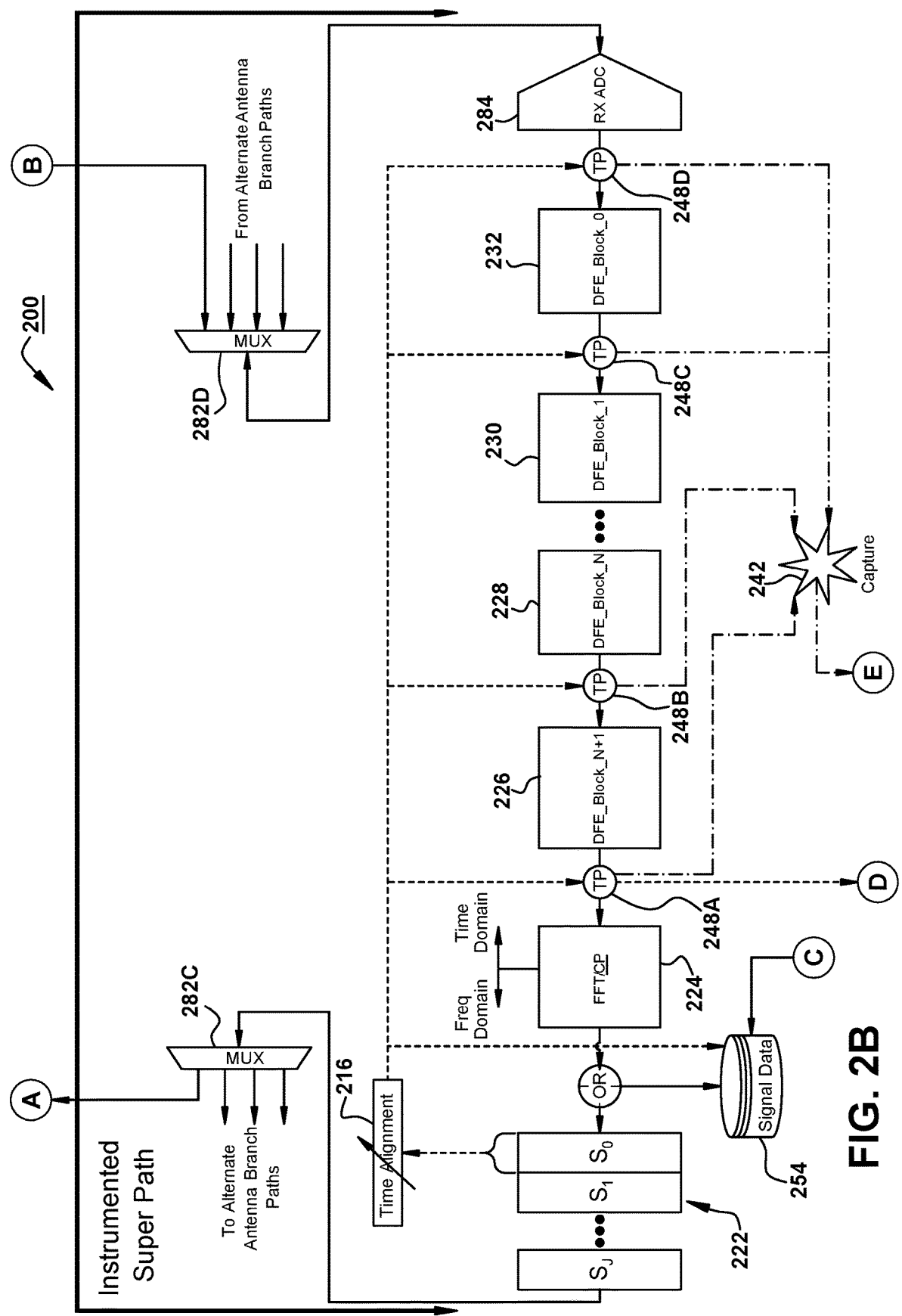
Figure 2C:
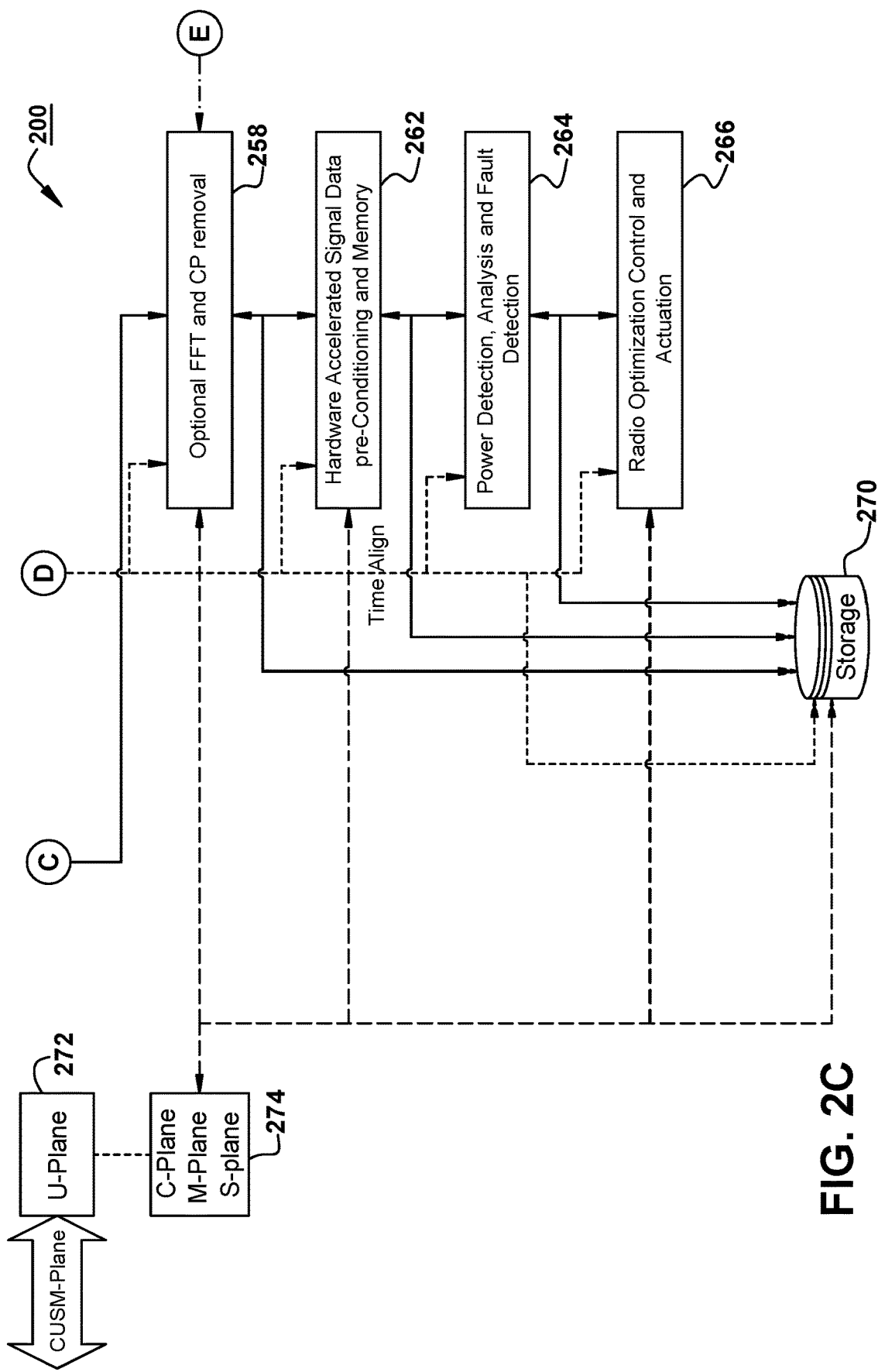

FIG. 2A, FIG. 2B, and FIG. 2C illustrate an example system architecture 200 for an up link chain of radio unit that can facilitate digital front end super paths, in accordance with an embodiment of this disclosure.

System architecture 200 can function as an uplink signal path of a radio system, where signals from the up link signal path can be routed, or multiplexed, to a digital front end super path. As depicted, system architecture 200 comprises time alignment 216, RBs/REs 222, FFT/CP 224, DFE block N+1 226, DFE block N 228, digital front end (DFE) block 2 230, DFE block 0 232, capture 242, tap point 248A, tap point 248B, tap point 248C, tap point 248D, signal data storage 254, hardware accelerated signal data pre-conditioning and memory 258, optional FFT and CP removal 262, analysis and fault detection 264, radio optimization control and actuation 266, storage 270, U-plane 272, C-plane, M-plane, S-plane 274, FFT/CP 276, DFE block N+1 278A, DFE block N 278B, DFE block 1 278C, DFE block 0 278D, receiver analog-to-digital converter (Rx ADC) 280, multiplexer 282A, multiplexer 282B, multiplexer 282C, multiplexer 282D, and custom symbol RBs/REs 284.

Multiplexer 282A can multiplex a signal on an antenna branch path further down that antenna branch path (e.g., to FFT/CP 276) and to multiplexer 282C for possible multiplexing into a super path (e.g., to RBs/REs 222). Multiplexer 282B can multiplex a signal from a super path back into that antenna branch path (e.g., to Tx DAC 280). In some examples, multiplexer 282D can multiplex a signal from the super path back into any antenna branch that is accessible via multiplexer 282D.

Figure 3:
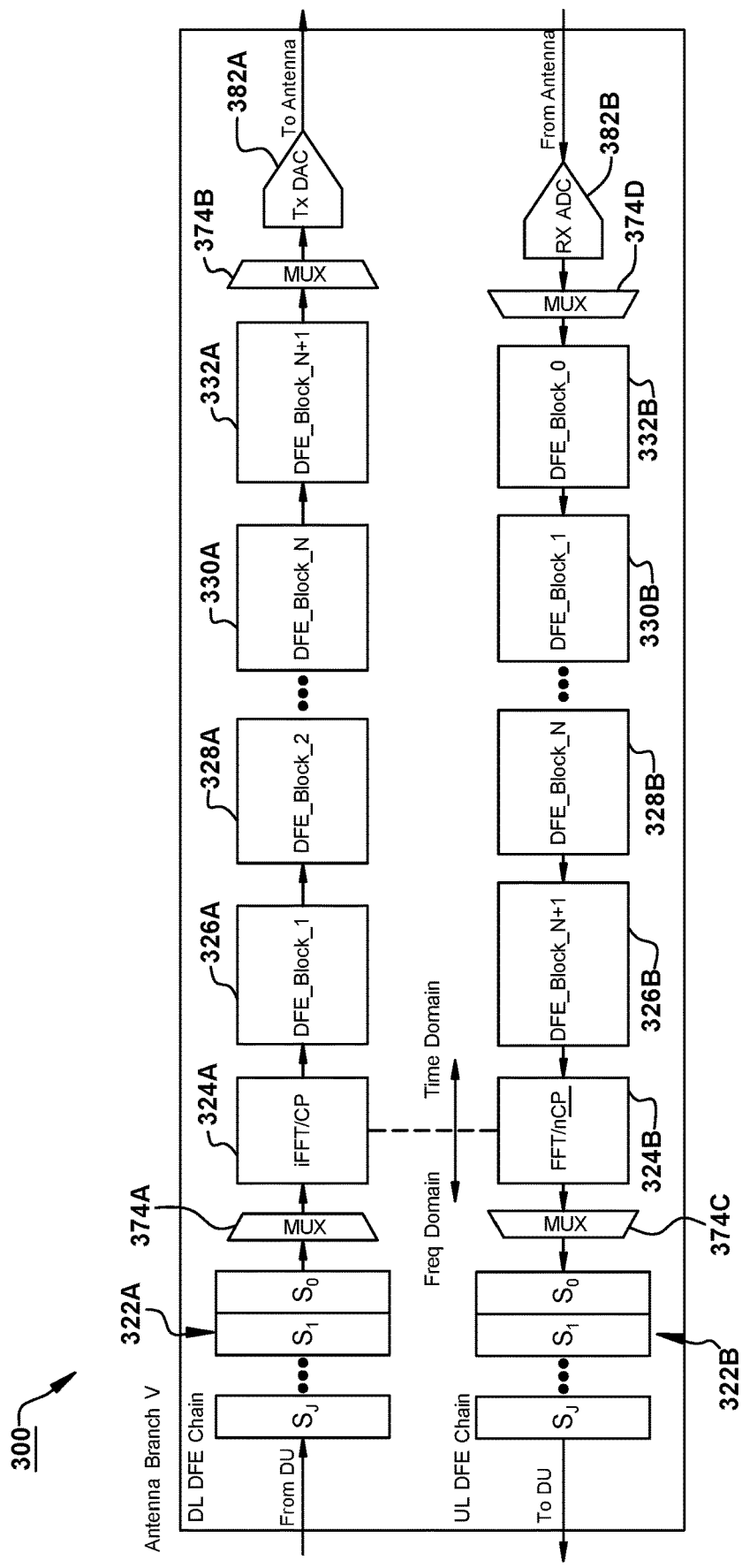
FIG. 3 illustrates an example system architecture for a digital front end super path in an antenna branch that comprises a down link path and an up link path, and that facilitate digital front end super paths, in accordance with an embodiment of this disclosure.

FIG. 3 illustrates an example system architecture 300 for a digital front end super path in an antenna branch that comprises a down link path and an up link path, and that facilitate digital front end super paths, in accordance with an embodiment of this disclosure.

System architecture 300 comprises RBs/REs 322A and RBs/REs 322B; iFFT/CP 324A; FFT/CP 324B; DFE block 1 326A; DFE block N+1 326B; DFE block 2 328A; DFE block N 328B; DFE block N 330A; DFE block 1 330B; DFE block N+1 332A; DFE block 0 332B; multiplexer 374A, multiplexer 374B, multiplexer 374C, and multiplexer 374D; Tx DAC 382A; and Rx ADC 382B.

In an antenna branch such as depicted in system architecture 300, a signal can be multiplexed in or out of a down link digital front end chain, via multiplexer 374A and multiplexer 374B. Similarly, a signal can be multiplexed in or out of an up link digital front end chain, via multiplexer 374C and multiplexer 374D.

Figure 4:
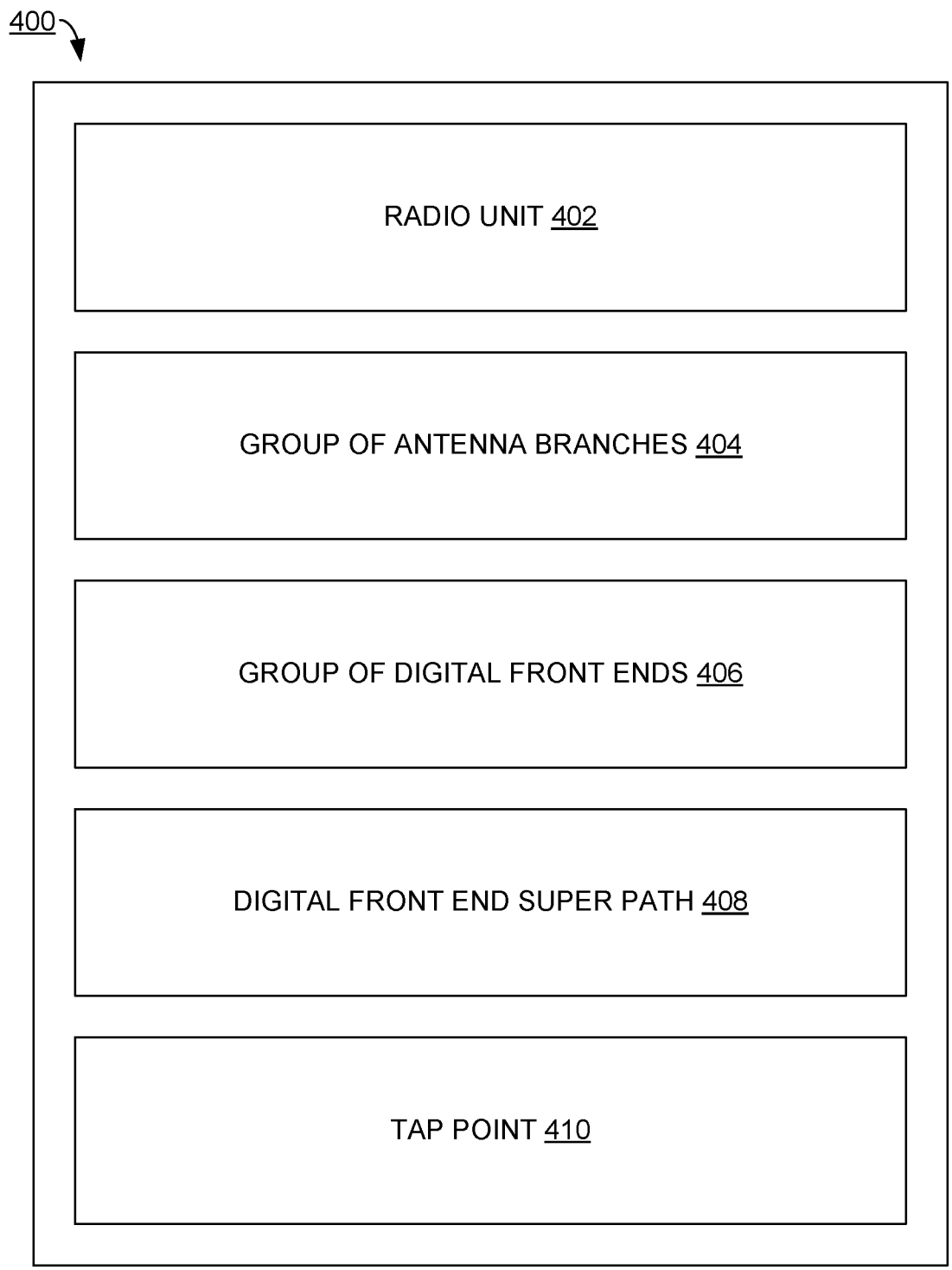
FIG. 4 illustrates an example system architecture that can facilitate digital front end super paths, in accordance with an embodiment of this disclosure.

FIG. 4 illustrates an example system architecture 400 that can facilitate digital front end super paths, in accordance with an embodiment of this disclosure. In some example, part(s) of system architecture 400 can be used to implement part(s) of system architecture 100 of FIGS. 1A-1C, system architecture 200, and/or system architecture 300 of FIG. 3.

System architecture 400 comprises radio unit 402; group of antenna branches 404; group of digital front ends 406; digital front end super path 408; and tap point 410. In some examples, respective digital front ends of group of digital front ends 406 are configured to process data of respective antenna branches of group of antenna branches 404. In some examples, digital front end super path 408 is configured to select between group of antenna branches 404, wherein digital front end super path 408 comprises tap point 410 at which data processed via digital front end super path 408 is able to be accessed.

In some examples, group of antenna branches 404 can comprise a group of antenna branches of a radio system. In some examples, group of digital front ends 406 can be similar to corresponding digital front ends to the group of antenna branches of the radio system. Digital front end super path 408 can be similar to a super path as depicted in system architecture 100, and/or system architecture 200. Tap point 410 can be similar to tap point 148A, and/or tap point 248A.

In the example of system architecture 400, there are N antennas and a corresponding number of digital front ends. There is also at least one digital front end super path, which can multiplex to and from any of the antenna branches of the N antennas.

In some examples, digital front end super path 408 is a main signal path for a selected antenna branch of group of antenna branches 404. That is, an instrumented digital front end super path can have an antenna main paths multiplexed to it, and thereby become the main signal path for that antenna branch.

In some examples, digital front end super path 408 is configured to, after selecting and processing data from a first antenna branch of group of antenna branches 404, select and process data from a second antenna branch of group of antenna branches 404. That is, in some examples, multiplexing can have antenna path switching at a system-acceptable rate between antenna branches.

In some examples, accessing the data processed via digital front end super path 408 at tap point 410 comprises reading the data processed via digital front end super path 408. In some examples, accessing the data processed via digital front end super path 408 at tap point 410 comprises writing at least some of the data processed via digital front end super path 408. That is, the tap point can be a tap point from which data is read, or a tap point to which data is injected.

In some examples, digital front end super path 408 comprises a down link signal path. In some examples, digital front end super path 408 comprises an up link signal path. That is, multiplexing and instrumenting a digital front end super path can be implemented for a down link path and/or an up link path.

Figure 5:
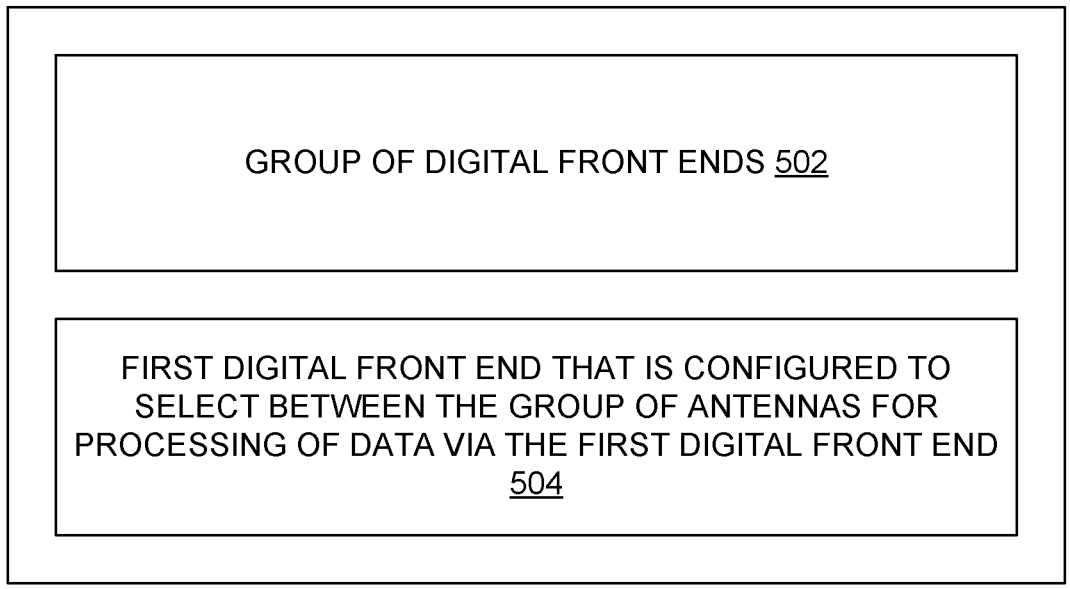
FIG. 5 illustrates another example system architecture that can facilitate digital front end super paths, in accordance with an embodiment of this disclosure.

FIG. 5 illustrates another example system architecture 500 that can facilitate digital front end super paths, in accordance with an embodiment of this disclosure. In some example, part(s) of system architecture 400 can be used to implement part(s) of system architecture 100, system architecture 200, and/or system architecture 300 of FIG. 3.

System architecture 500 comprises group of digital front ends 502; and first digital front end that is configured to select between the group of antennas for processing of data via the first digital front end 504. In some examples, group of digital front ends 502 can be part of a radio unit, and respective digital front ends of group of digital front ends 502 can be configured to process data of respective antenna branches of a group of antenna branches. In some examples, first digital front end 504 is separate from group of digital front ends 502.

In some examples, group of digital front ends 502 can be similar to group of digital front ends 406 of FIG. 4. In some examples, first digital front end 504 can be similar to digital front end super path 408 of FIG. 4.

In some examples, first digital front end 504 comprises a fully instrumented path that comprises an injection tap point and a capture tap point.

A fully instrumented path can be a signal path in a radio unit that has an ability to capture or inject signals at predetermined tap point, where this ability is not generally found in normal digital front end data paths.

That is, a fully instrumented path can have instrumentation tap points to inject or capture signal before and after passing through a transfer function as dictated by the setup of a digital front end chain.

In some examples, instrumentation of mixed signal digital and radio frequency design can be defined by common reference as the instruments such as: signal generators, signal analyzers (e.g., vector signal analyzers), power detectors, BaseBand digital signal injection and capture, BaseBand protocol and link emulators, channel emulators and faders, voltage and current detectors, and memory and storage devices.

In some examples, first digital front end 504 is configurable to each digital configuration associated with respective digital front ends of group of digital front ends 502. That is, a digital front end super path can be configurable to digital configuration copying of some or all digital configurations on main live-air paths.

In some examples, first digital front end 504 comprises a dedicated supervision path. That is, a digital front end super path can have a dedicated supervision path.

In some examples, first digital front end 504 is configured to carry a copy of any live-air path antenna path signal data of the group of antenna branches. In some examples, first digital front end 504 is configured to temporarily replace a live-air path and carry live live-air path signal data concurrently with furnishing instrumentation of the first digital front end. That is, in some examples, a digital front end super path can carry a copy of any live-air path antenna path signal data, or temporarily replace a live-air path and carry live live-air signal data while simultaneously furnishing instrumentation.

EXAMPLE PROCESS FLOWS

FIG. 6 illustrates an example process flow 600 that can facilitate digital front end super paths, in accordance with an embodiment of this disclosure. In some examples, one or more embodiments of process flow 600 can be implemented by system architecture 100, system architecture 200, and/or system architecture 300 of FIG. 3.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts selecting a first antenna branch from a group of antenna branches of a radio unit, wherein respective digital front ends of a group of digital front ends are configured to process data of respective antenna branches of the group of antenna branches. In some examples, the group of antenna branches can be similar to group of antenna branches 404 of FIG. 4

After operation 604, process flow 600 moves to operation 606.

Operation 606 depicts, in response to selecting the first antenna branch, routing data for the first antenna branch through a digital front end super path, wherein the digital front end super path is configured to selectively route data for antenna branches of the group of antenna branches. In some examples, the digital front end super path can comprise digital front end super path 408 of FIG. 4

In some examples, the digital front end super path comprises a first group of signal processing configurations, wherein respective digital front ends of the group of digital front ends each maintain a respective second group of signal processing configurations, and wherein the first group of signal processing configurations matches the second group of signal processing configurations. That is, in some examples, an instrumented digital front end super path can maintain all of the signal processing configurations that are found on the non-instrumented main digital front end paths.

After operation 606, process flow 600 moves to 608, where process flow 600 ends.

Figure 7:
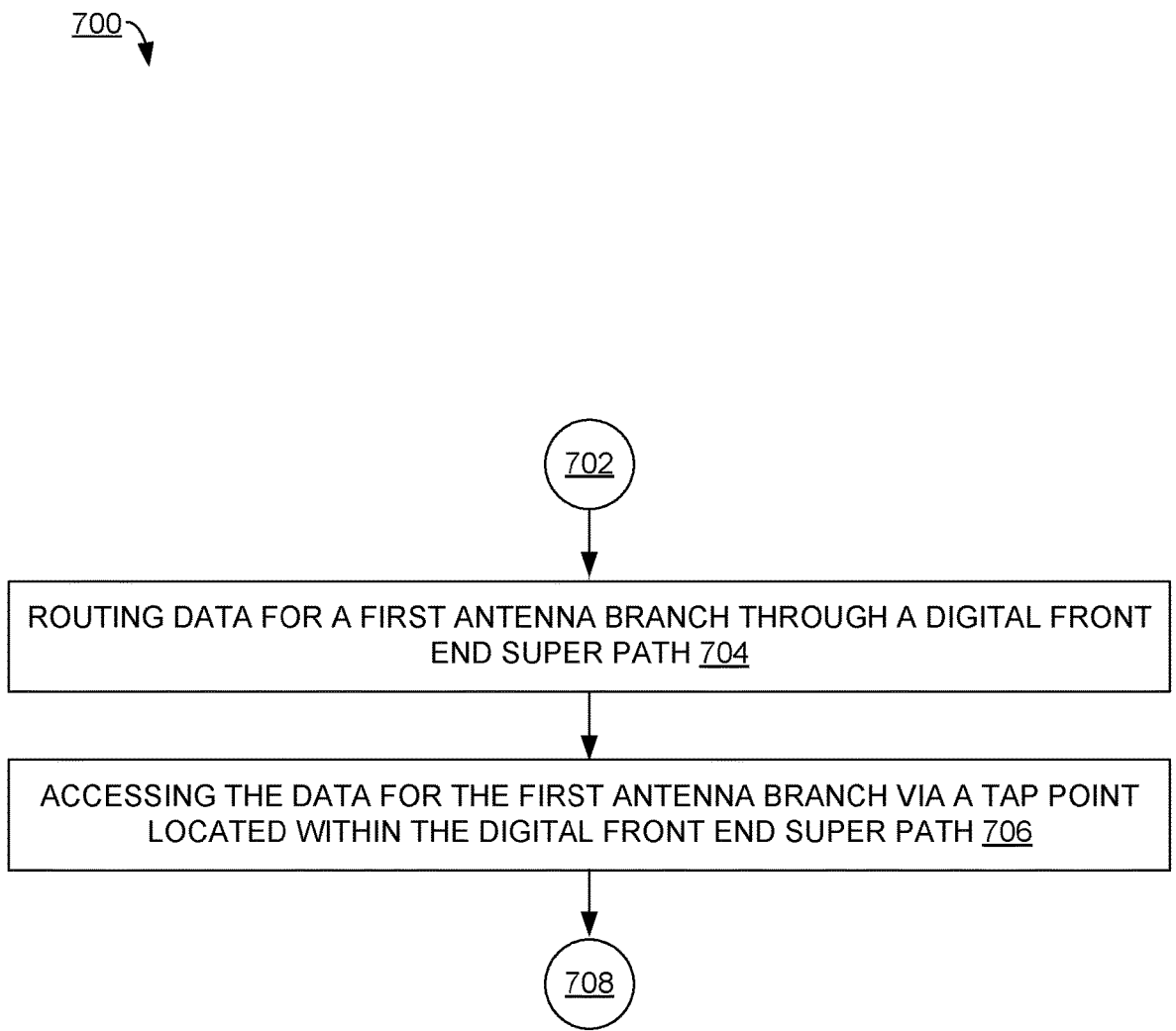
FIG. 7 illustrates another example process flow that can facilitate digital front end super paths, in accordance with an embodiment of this disclosure.

FIG. 7 illustrates an example process flow 700 that can facilitate digital front end super paths, in accordance with an embodiment of this disclosure. In some examples, one or more embodiments of process flow 700 can be implemented by system architecture 100, system architecture 200, and/or system architecture 300 of FIG. 3.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 depicts routing data for a first antenna branch through a digital front end super path. In some examples, operation 704 can be implemented in a similar manner as operation 606 of FIG. 6.

After operation 704, process flow 700 moves to operation 706.

Operation 706 depicts accessing the data for the first antenna branch via a tap point located within the digital front end super path. In some examples where the digital front end super path is similar to digital front end super path 408 of FIG. 4, data passing through the digital front end super path can be accessed via tap point 410.

In some examples, the tap point is a first tap point, and wherein the group of digital front ends omits a second tap point. That is, it can be that tap points (or particular tap points at certain positions relative to a signal chain) are located only in the digital front end super path, and not in the other digital front ends, so as to reduce a number of tap points implemented for a radio system while still ensuring full instrumentation of a digital front end signal path.

After operation 706, process flow 700 moves to 708, where process flow 700 ends.

Figure 8:
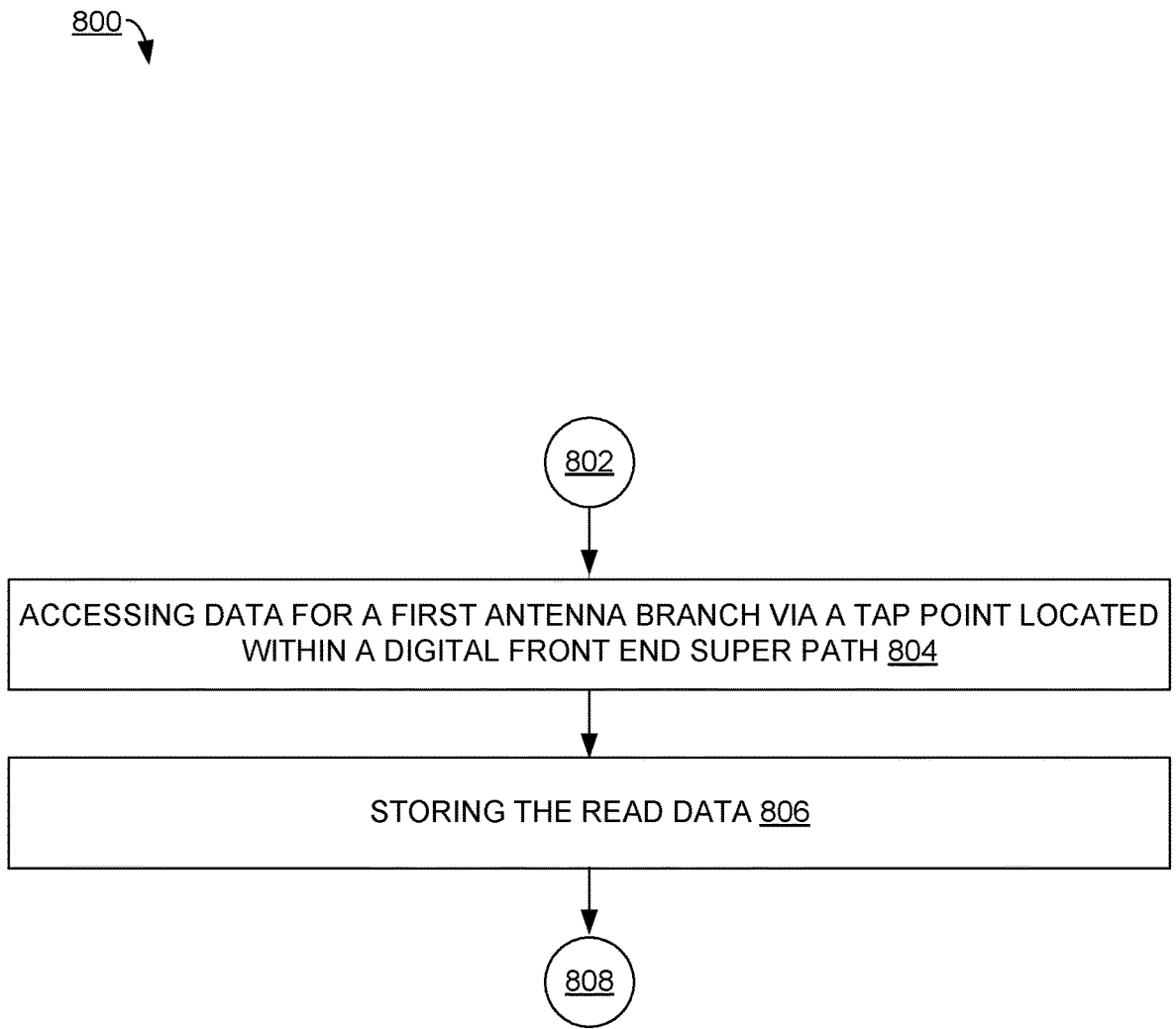
FIG. 8 illustrates another example process flow that can facilitate digital front end super paths, in accordance with an embodiment of this disclosure.

FIG. 8 illustrates an example process flow 800 that can facilitate digital front end super paths, in accordance with an embodiment of this disclosure. In some examples, one or more embodiments of process flow 800 can be implemented by system architecture 100, system architecture 200, and/or system architecture 300 of FIG. 3.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts accessing data for a first antenna branch via a tap point located within a digital front end super path. In some examples, operation 804 can be implemented in a similar manner as operation 704 of FIG. 7.

After operation 804, process flow 800 moves to operation 806.

Operation 806 depicts storing the read data. That is, data read via a tap point of a digital front end super path can be stored within a radio system, such as for later analysis.

After operation 806, process flow 800 moves to 808, where process flow 800 ends.

Figure 9:
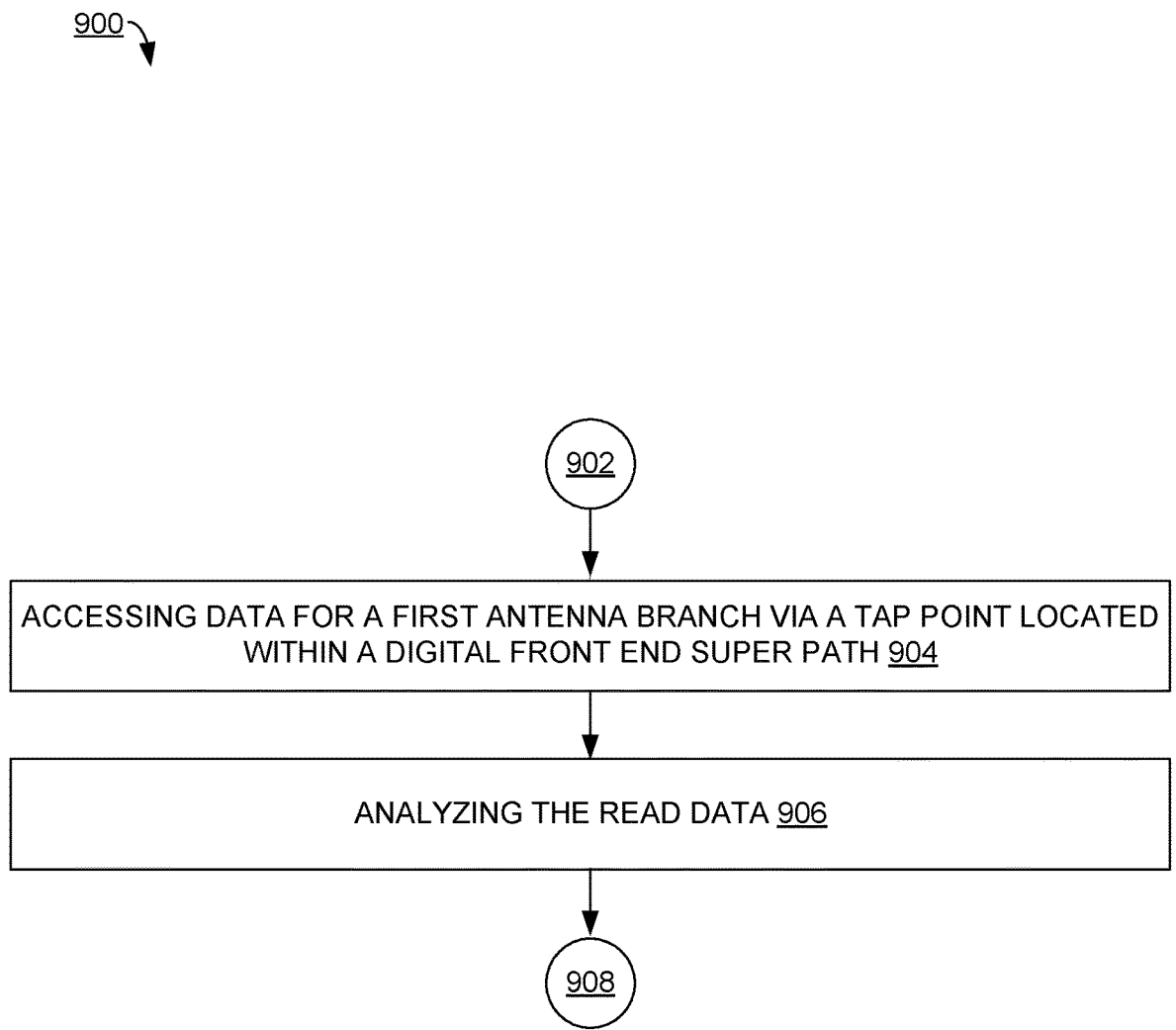
FIG. 9 illustrates another example process flow that can facilitate digital front end super paths, in accordance with an embodiment of this disclosure.

FIG. 9 illustrates an example process flow 900 that can facilitate digital front end super paths, in accordance with an embodiment of this disclosure. In some examples, one or more embodiments of process flow 900 can be implemented by system architecture 100, system architecture 200, and/or system architecture 300 of FIG. 3.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts accessing data for a first antenna branch via a tap point located within a digital front end super path. In some examples, operation 904 can be implemented in a similar manner as operation 704 of FIG. 7.

After operation 904, process flow 900 moves to operation 906.

Operation 906 depicts analyzing the read data. That is, data read via a tap point of a digital front end super path can be analyzed, such as to determine a performance metric of a radio system.

After operation 906, process flow 900 moves to 908, where process flow 900 ends.

Figure 10:
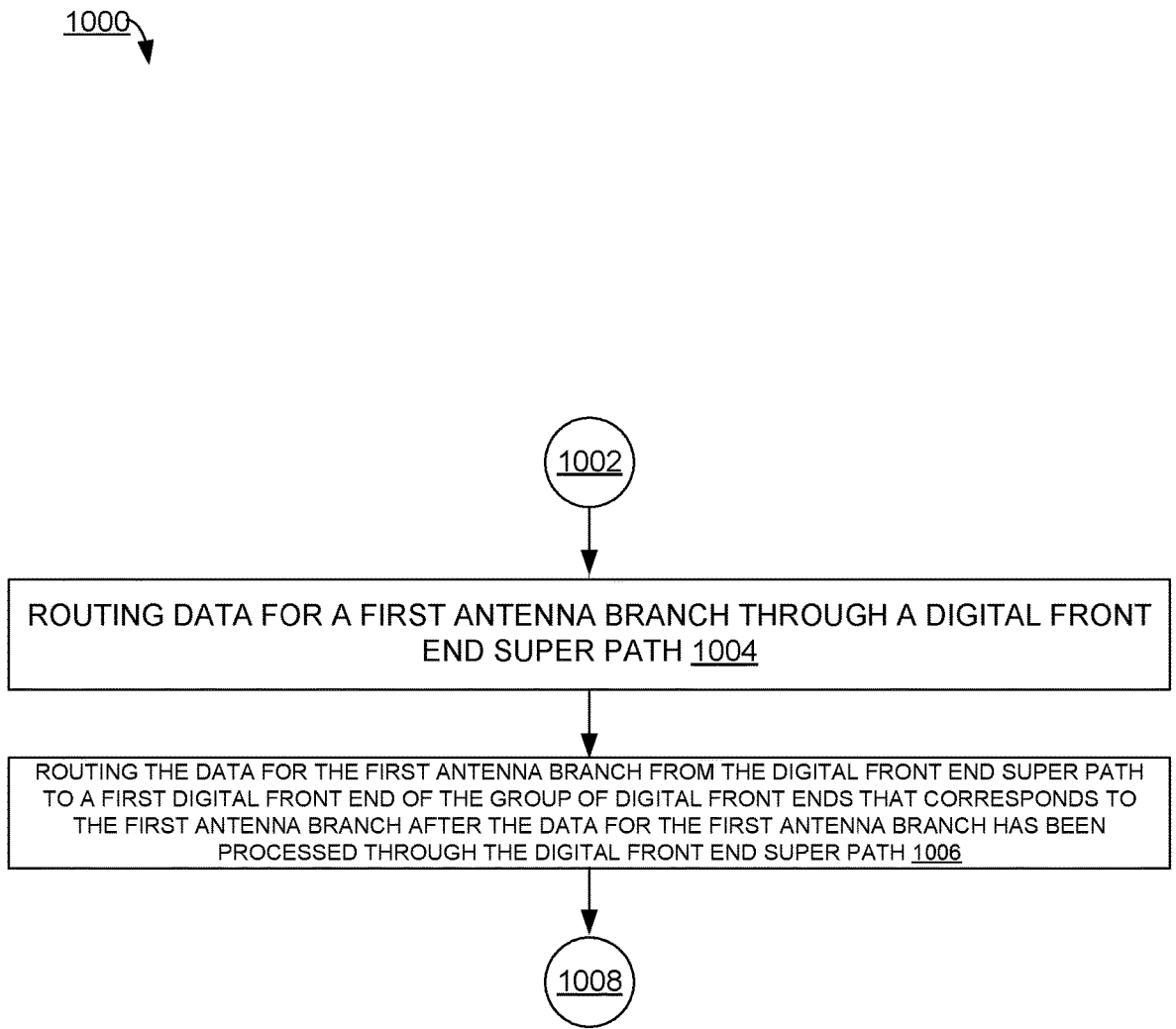
FIG. 10 illustrates another example process flow that can facilitate digital front end super paths, in accordance with an embodiment of this disclosure.

FIG. 10 illustrates an example process flow 1000 that can facilitate digital front end super paths, in accordance with an embodiment of this disclosure. In some examples, one or more embodiments of process flow 1000 can be implemented by system architecture 100, system architecture 200, and/or system architecture 300 of FIG. 3.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts routing data for a first antenna branch through a digital front end super path. In some examples, operation 1004 can be implemented in a similar manner as operation 606 of FIG. 6.

After operation 1004, process flow 1000 moves to operation 1006.

Operation 1006 depicts routing the data for the first antenna branch from the digital front end super path to a first digital front end of the group of digital front ends that corresponds to the first antenna branch after the data for the first antenna branch has been processed through the digital front end super path. That is, digital front end super path multiplexing can be performed after a signal passes through the digital front end super path to return the signal to its original antenna branch.

After operation 1006, process flow 1000 moves to 1008, where process flow 1000 ends.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
    a radio unit;
    a group of antenna branches of the radio unit;
    a group of digital front ends of the radio unit, wherein respective digital front ends of the group of digital front ends are configured to process data of respective antenna branches of the group of antenna branches; and
    a digital front end super path that is configured to select between the group of antenna branches, wherein the digital front end super path comprises a tap point within the digital front end super path at which data processed via the digital front end super path is able to be accessed, wherein the data processed via the digital front end super path travels outside of any digital front end of the group of digital front ends.

2. The system of claim 1, wherein the digital front end super path is a main signal path for a selected antenna branch of the group of antenna branches.

3. The system of claim 1, wherein the digital front end super path is configured to, after selecting and processing data from a first antenna branch of the group of antenna branches, select and process data from a second antenna branch of the group of antenna branches.

4. The system of claim 1, wherein accessing the data processed via the digital front end super path at the tap point comprises reading the data processed via the digital front end super path.

5. The system of claim 1, wherein accessing the data processed via the digital front end super path at the tap point comprises writing at least some of the data processed via the digital front end super path.

6. The system of claim 1, wherein the digital front end super path comprises a down link signal path.

7. The system of claim 1, wherein the digital front end super path comprises an up link signal path.

8. A method, comprising:
    selecting, by a system comprising at least one processor, a first antenna branch from a group of antenna branches of a radio unit, wherein respective digital front ends of a group of digital front ends are configured to process data of respective antenna branches of the group of antenna branches; and
    in response to selecting the first antenna branch, routing, by the system, data for the first antenna branch through a digital front end super path, wherein the digital front end super path is configured to selectively route data for antenna branches of the group of antenna branches, and wherein the data processed via the digital front end super path travels outside of any of the digital front ends of the group of digital front ends.

9. The method of claim 8, further comprising:
accessing, by the system, the data for the first antenna branch via a tap point located within the digital front end super path.

10. The method of claim 9, wherein accessing the data for the first antenna branch via the tap point results in a read data, and further comprising:
storing, by the system, the read data.

11. The method of claim 9, wherein accessing the data for the first antenna branch via the tap point results in a read data, and further comprising:
analyzing, by the system, the read data.

12. The method of claim 9, wherein the tap point is a first tap point, and wherein the group of digital front ends omits a second tap point.

13. The method of claim 8, further comprising:
routing, by the system, the data for the first antenna branch from the digital front end super path to a first digital front end of the group of digital front ends that corresponds to the first antenna branch after the data for the first antenna branch has been processed through the digital front end super path.

14. The method of claim 8, wherein the digital front end super path comprises a first group of signal processing configurations, wherein respective digital front ends of the group of digital front ends each maintain a respective second group of signal processing configurations, and wherein the first group of signal processing configurations matches the second group of signal processing configurations.

15. A system, comprising:
a radio unit comprising antenna branches;
digital front ends of the radio unit, wherein respective digital front ends of the digital front ends are configured to process data of respective antenna branches of the antenna branches; and
a digital front end super path that is configured to select between the antenna branches, wherein the digital front end super path comprises a tap point at which data processed via the digital front end super path is able to be accessed, wherein the data processed via the digital front end super path travels outside of any digital front end of the digital front ends.

16. The system of claim 15, wherein the first digital front end comprises a fully instrumented path that comprises an injection tap point and a capture tap point.

17. The system of claim 15, wherein the first digital front end is configurable to each digital configuration associated with respective digital front ends of the group of digital front ends.

18. The system of claim 15, wherein the first digital front end comprises a dedicated supervision path.

19. The system of claim 15, wherein the first digital front end is configured to carry a copy of any live-air antenna path signal data of the group of antenna branches.

20. The system of claim 15, wherein the first digital front end is configured to temporarily replace a live-air path and carry live-air path signal data concurrently with furnishing instrumentation of the first digital front end.

* * * * *